United States Patent

Ham

(10) Patent No.: US 7,140,075 B2
(45) Date of Patent: *Nov. 28, 2006

(54) VERTICAL DOOR CONVERSION KIT WITH LAG MECHANISM AND MOTION RANGE LIMITER

(75) Inventor: Demetrius C Ham, East Orange, NJ (US)

(73) Assignee: Decah, LLC, Livingston, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/888,159

(22) Filed: Jul. 10, 2004

(65) Prior Publication Data

US 2004/0244144 A1 Dec. 9, 2004

Related U.S. Application Data

(63) Continuation-in-part of application No. 10/305,522, filed on Nov. 26, 2002, now Pat. No. 6,845,547.

(51) Int. Cl.
*E05D 3/10* (2006.01)
*E05D 11/06* (2006.01)

(52) U.S. Cl. ............................ 16/374; 16/367; 16/239; 16/246; 16/248

(58) Field of Classification Search .......... 16/374–376, 16/242, 235–239, 241, 246, 248, 367; 49/139, 49/192, 236, 232, 240, 245, 226, 280; 296/146.11, 296/146.12, 79, 96, 146.8
See application file for complete search history.

(56) References Cited

U.S. PATENT DOCUMENTS

| | | | |
|---|---|---|---|
| 2,142,319 A * | 1/1939 | Leonard | 16/302 |
| 2,178,908 A | 11/1939 | Hudson | |
| 2,322,933 A * | 6/1943 | Harmon et al. | 16/278 |
| 2,374,697 A | 5/1945 | Palisano | |
| D150,161 S | 7/1948 | Sanmori | |
| 2,775,478 A * | 12/1956 | Stimetz et al. | 49/239 |
| 2,777,728 A | 1/1957 | Barenyi | |
| 3,150,408 A | 9/1964 | Belsky | |
| 3,275,370 A | 9/1966 | Smith | |
| 3,589,069 A | 6/1971 | Lecomte | |
| 3,594,853 A * | 7/1971 | Slattery | 16/354 |
| 3,628,216 A * | 12/1971 | Savell | 16/287 |
| 3,870,361 A | 3/1975 | Krause | |
| 4,238,876 A | 12/1980 | Monroe et al. | |
| 4,532,675 A | 8/1985 | Salazar | |
| 4,654,929 A * | 4/1987 | Fahnders et al. | 16/261 |
| 4,684,167 A | 8/1987 | Newmayer | |
| 4,692,964 A * | 9/1987 | DeBruyn | 16/367 |
| 4,719,665 A | 1/1988 | Bell | |

(Continued)

FOREIGN PATENT DOCUMENTS

DE 3423037 A1 * 1/1986

(Continued)

*Primary Examiner*—Chuck Y. Mah
(74) *Attorney, Agent, or Firm*—Carella Byrne Bain et al.; William Squire

(57) ABSTRACT

A door hinge mechanism allowing two dimensional motion of the door as it opens, combined with at least one mechanism allowing control of the range of horizontal motion of the door during normal operations. Horizontal lag adjustment and range limitation of the mechanism allows a number of benefits: horizontal fit of the door to the frame may be controlled, the outward motion of the door may be curtailed at the proper angle desired by the user. The door hinge mechanism is a bi-directional hinge allowing sequential motion in two planes, and a horizontal motion stop and cooperating contact surface.

27 Claims, 6 Drawing Sheets

U.S. PATENT DOCUMENTS

| | | | |
|---|---|---|---|
| 4,766,643 A | | 8/1988 | Salazar |
| 4,776,626 A | * | 10/1988 | Seyler .................... 296/76 |
| 4,801,172 A | | 1/1989 | Townsend |
| 5,013,082 A | | 5/1991 | Landmesser |
| 5,035,463 A | | 7/1991 | Kato et al. |
| 5,074,609 A | * | 12/1991 | Dear ...................... 296/76 |
| 5,242,208 A | | 9/1993 | Ohya |
| 5,261,720 A | | 11/1993 | Lomax, Jr. et al. |
| 5,265,311 A | * | 11/1993 | Gard ...................... 16/312 |
| 5,557,829 A | * | 9/1996 | Schoen et al. ............ 16/375 |
| 5,570,498 A | | 11/1996 | Hipkiss |
| 5,600,868 A | * | 2/1997 | Tourville et al. ........ 16/277 |
| 5,918,347 A | * | 7/1999 | Morawetz ............... 16/322 |
| 5,921,611 A | | 7/1999 | Townsend |
| 5,992,918 A | | 11/1999 | Gobart et al. |
| 6,000,747 A | | 12/1999 | Sehgal et al. |
| 6,030,025 A | * | 2/2000 | Kanerva .............. 296/146.12 |
| 6,036,256 A | | 3/2000 | Hilliard et al. |
| 6,047,445 A | * | 4/2000 | Mennen .................. 16/374 |
| 6,086,137 A | | 7/2000 | Leschke et al. |
| 6,149,222 A | | 11/2000 | Schambre |
| 6,175,991 B1 | | 1/2001 | Driesman et al. |
| 6,178,593 B1 | * | 1/2001 | Carlson .................... 16/82 |
| 6,314,615 B1 | | 11/2001 | Wolda |
| 6,332,243 B1 | * | 12/2001 | Kim ...................... 16/334 |
| 6,447,043 B1 | * | 9/2002 | VandenHeuvel et al. ...... 296/76 |
| 6,629,337 B1 | * | 10/2003 | Nania ..................... 16/334 |
| 6,676,193 B1 | * | 1/2004 | Hanagan ............... 296/146.11 |
| 6,676,196 B1 | * | 1/2004 | Smith .................. 296/146.8 |
| 6,695,395 B1 | | 2/2004 | Kallio |
| 6,808,223 B1 | * | 10/2004 | Baum et al. ........... 296/146.12 |
| 6,820,918 B1 | * | 11/2004 | DeBono ............... 296/146.11 |
| 6,845,547 B1 | | 1/2005 | Ham |
| 2002/0059692 A1 | * | 5/2002 | Jacquin .................... 16/381 |
| 2004/0187263 A1 | * | 9/2004 | Hoffman ................ 16/367 |
| 2004/0256882 A1 | | 12/2004 | McRobert |
| 2005/0022342 A1 | * | 2/2005 | Ham ...................... 16/374 |
| 2005/0204511 A1 | * | 9/2005 | Wohlfarth ................ 16/367 |

FOREIGN PATENT DOCUMENTS

| | | |
|---|---|---|
| DE | 3539276 C * | 1/1987 |
| DE | 42 06 288 A1 | 9/1993 |
| DE | 4319662 | 12/1994 |
| DE | 19738825 | 3/1999 |
| DE | 10025925 | 11/2001 |
| EP | 0 493 225 A1 | 7/1992 |
| EP | 767082 A1 * | 4/1997 |
| FR | 2 694 244 A1 | 2/1994 |
| JP | 6024245 | 2/1994 |

* cited by examiner

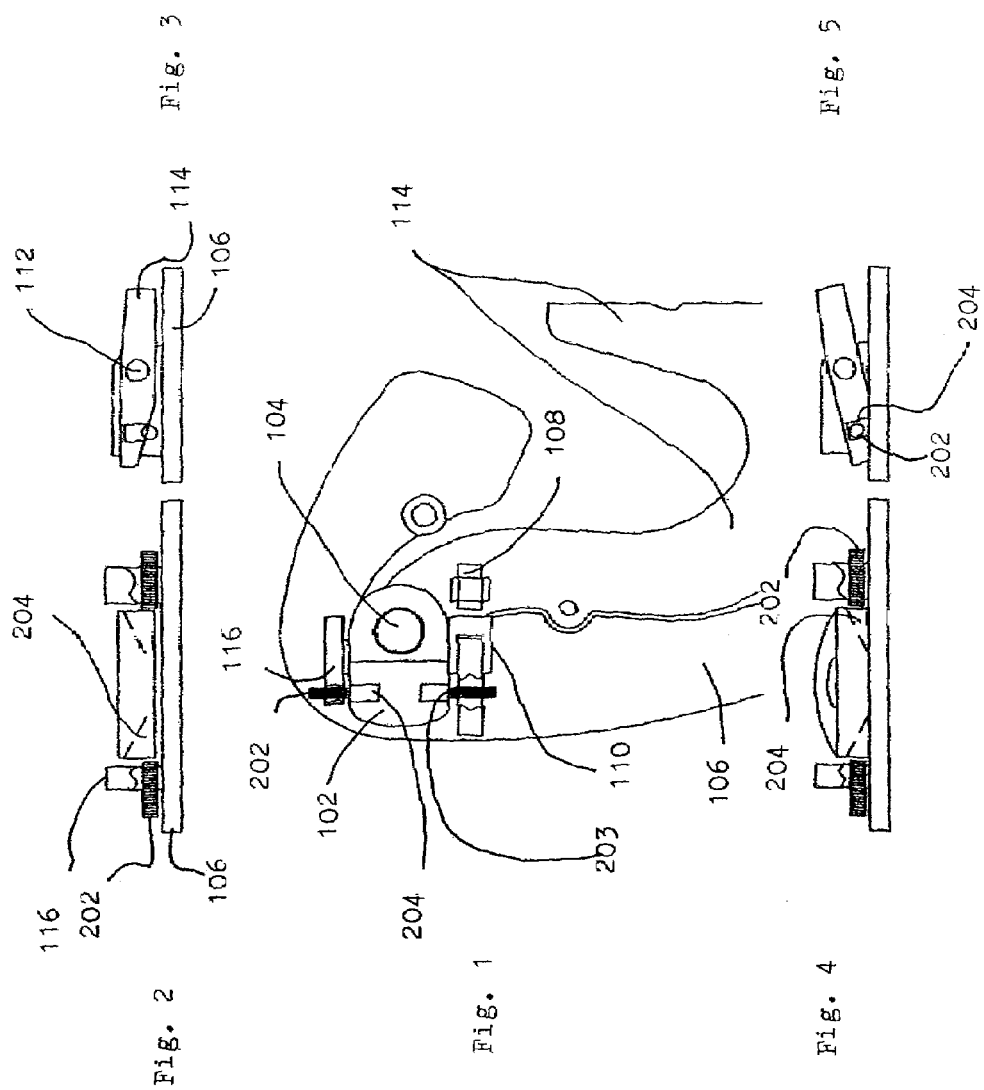

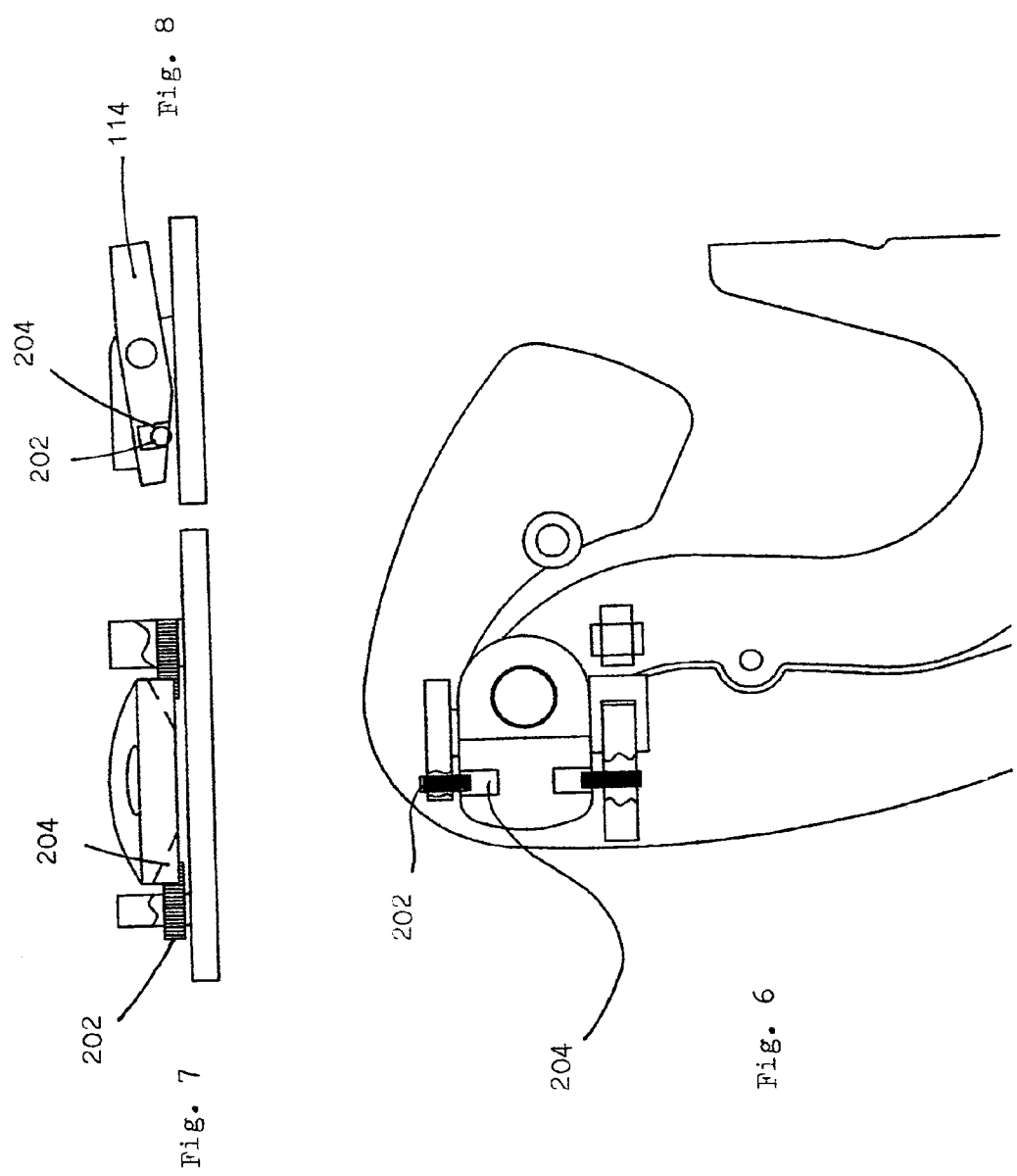

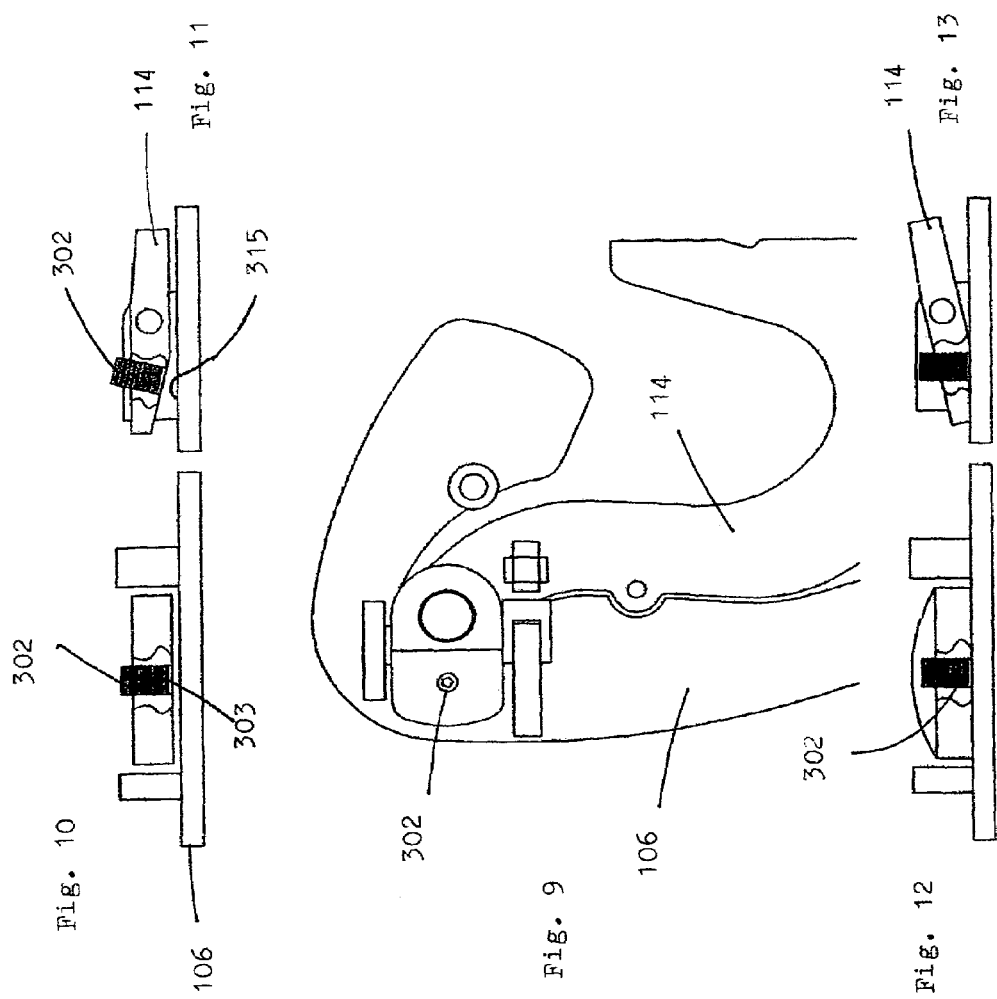

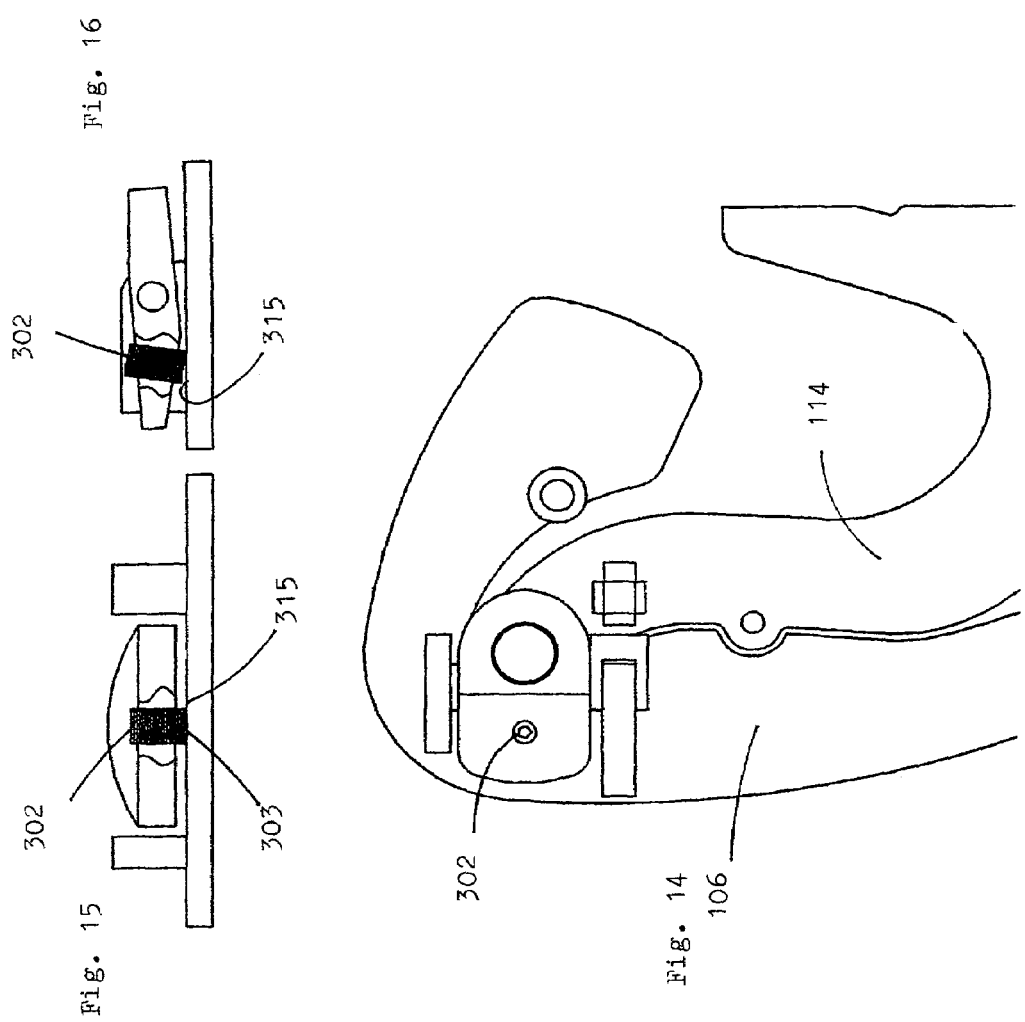

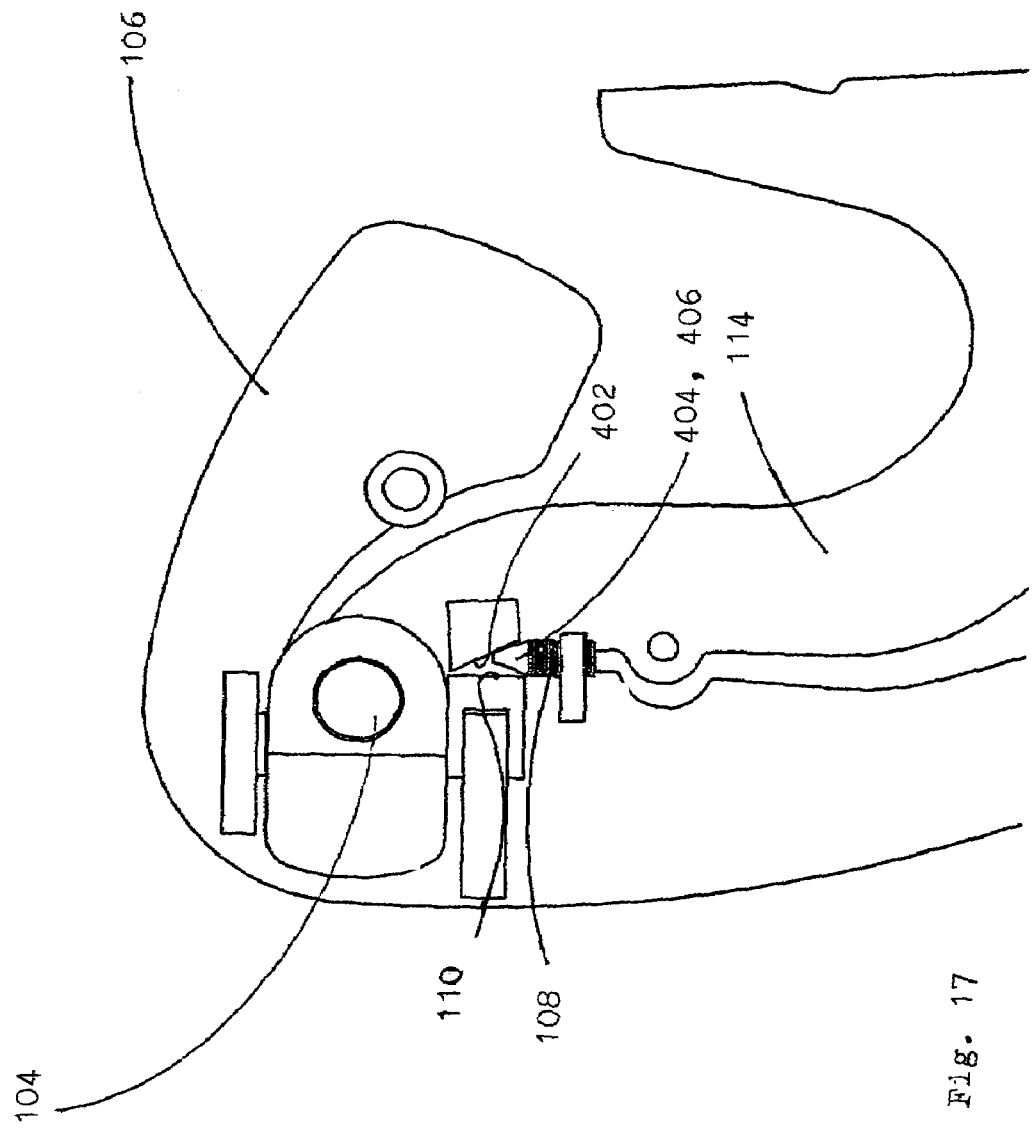

VERTICAL DOOR CONVERSION KIT WITH LAG MECHANISM AND MOTION RANGE LIMITER

CROSS REFERENCE TO RELATED APPLICATIONS

This application is a continuation-in-part of parent application Ser. No. 10/305,522 filed in the United States Patent and Trademark Office on Nov. 26th, 2002, with the title VERTICAL DOOR CONVERSION KIT in the name of the same inventor, Demetrius C. Ham, now U.S. Pat. No. 6,845,547, for which the entire disclosure is incorporated by reference.

FIELD OF THE INVENTION

This invention relates generally to vehicle doors and specifically to door hinge mechanisms allowing vehicle doors to rotate upward from the vehicle when opened.

BACKGROUND OF THE INVENTION

Conventional door hinges on automobiles have a number of problems. As is well known, such conventional systems hinge the door at the front of the edge and swing the door outwards through a horizontal arc which brings the rear edge of the door quite distant from the vehicle body. A spring action which assists in the opening of the door attempts to push the door open to substantially the full distance it is capable of opening. Opening the door in this fashion results in either the door's rear edge hitting whatever the vehicle is stopped next to or else requires the user to "fight" the door continuously as they get out of the vehicle, to prevent the door from reaching the full extension outwards. Since vehicles quite often end up parked next to either another vehicle or an abrasive concrete surface, allowing the door to swing out and impact the object next to the vehicle is distinctly undesirable.

Even when the user is not forced to limit the door's motion to a safe degree (for example, when the vehicle is parallel parked or parked next to an empty parking spot), the door itself is usually partially in the way of the user. Typically, the door opens somewhat less than 90 degrees and has a substantial width and a fair number of projections such as interior door handles, knobs, window controls, etc. The result is that around one half of the available arc beside the vehicle is covered by the door, making entry and egress a bit more difficult. Occasionally, a user may be blocked from even reaching the vehicle's entryway by the body of the door, for example, when the door is already open and the user approaches the vehicle from the front. Either the door must be partially or wholly closed to allow the user to squeeze past, then reopened to allow entry, or the user must walk around the vehicle the other direction.

Given the omnipresence of traffic, such diversions from simple entry are dangerous to users, and when a vehicle is parallel parked, a projecting door on the driver's side of the vehicle becomes an obstacle and danger to traffic. The projecting door itself is also in danger of being struck and damaged by passing traffic.

One possible solution to the horizontally hinged door is the vertically hinged door. Certain expensive types of automobiles have frames custom designed to support vertically hinged doors. Such doors are hinged to swing straight upwards at opening, in an arc in one dimension. However, it is normally necessary to implement such doors at the time the vehicle frame is designed, so as to allow for a frame which does not impede the top of door when it moves vertically.

Various references have been made of record in the parent application to this application.

U.S. Pat. No. 2,777,728 issued Jan. 15, 1957 to Barenyi for MOTOR VEHICLE ACCESSIBLE BY MEANS OF A PIVOTAL CAP teaches a one dimensional hinge in which the entire cab of the vehicle rotates in one plane of motion.

U.S. Pat. No. 3,870,361 issued Mar. 11, 1975 to Krause for HINGED SYSTEM FOR AUTOMOBILE DOORS WITH HINGE HALVES WELDED TO BODY AND DOOR teaches a one dimensional hinge in which the vehicle door rotates in one plane of motion. This patent also teaches an eccentric bushing allowing adjustment of the door hinge to achieve a tight fit; details of the structure of the bushing are different from the present invention.

U.S. Pat. No. 4,238,876 issued Dec. 16, 1980 to Monroe et al for METHOD FOR CONVERTING HARD TOP VEHICLES TO REMOVABLE TOP VEHICLES teaches non-analogous devices for sealing a vehicle roof to a car body. No hinges are discussed.

U.S. Pat. No. 4,684,167 issued Aug. 4, 1987 to Newmayer for ROOF HINGED DOOR APPARATUS teaches a one dimensional hinge allowing rotation of a vehicle door in one plane of motion. The hinge is located at the top of the door, not the front, and the form of rotation would necessarily involve a large and undesirable swing outwards away from the vehicle body, making opening the door impossible when parked close to another vehicle or other obstruction.

U.S. Pat. No. 5,013,082 issued May 7, 1991 to Landmesser for DOOR HINGING SYSTEM teaches a vertically opening door which moves in a single plane of motion on a substantial support arm located somewhere on the auto body.

U.S. Pat. No. 5,242,208 issued Sep. 7, 1993 to Ohya for STRUCTURE OF A BODY OF AN AUTOMOTIVE VEHICLE teaches not one but two single plane hinges which move a portion of the car door in a single plane vertically upwards and a second portion of the car door in a second single plane in the normal fashion.

U.S. Pat. No. 5,261,720 issued Nov. 16, 1993 to Lomax, Jr. et al for VERTICALLY MOVING CAR DOOR teaches a rear hatch which slides upwards in a single plane of motion, on rails.

U.S. Pat. No. 5,921,611 issued Jul. 13, 1999 to Townsend for UPWARDLY RETRACTING VEHICLE DOOR also teaches a rear hatch which rotates upwards in a single plane of motion, on rails.

U.S. Pat. No. 5,992,918 issued Nov. 20, 1999 to Gobart et al for BI-FOLD GULL WING VEHICLE DOOR teaches a design in which the vehicle door only rotates in one plane but actually folds up in the middle, that is, it has two sets of hinges, one set at the top of the door and one set in the middle of the door itself to provide the fold.

U.S. Pat. No. 6,036,256 issued Mar. 14, 2000 to Hilliard et al for WINDOW ASSEMBLY FOR A MOTOR VEHICLE teaches a window frame into which the window is removably mounted. It appears to be non-analogous.

In addition, the Office has made of record the following additional items of prior art during the prosecution of the parent application hereto:

U.S. Pat. No. 6,629,337 issued October 2003 to Nania; U.S. Pat. No. 6,447,043 issued September 2002 to Vanden Heuvel et al; U.S. Pat. No. 6,178,593 issued January 2001 to Carlson; U.S. Pat. No. 5,918,347 issued July 1999 to Morawetz; U.S. Pat. No. 5,600,868 issued February 1997 to Tourville et al; U.S. Pat. No. 5,265,311 issued November 1993 to Gard; U.S. Pat. No. 5,074,609 issued December 1991 to Dear; U.S. Pat. No. 4,776,626 issued October 1988 to Seyler; U.S. Pat. No. 4,692,964 issued September 1987 to DeBruyn; U.S. Pat. No. 3,628,216 issued December 1971 to Savell; U.S. Pat. No. 3,594,853 issued July 1971 to Slattery. International patent documents brought to the attention of the applicant by the examiner in the previous application are: DE 3539276 C dated January 1987 in Germany to Freudenber and DE 3423037 A1 dated January 1986 in Germany to Rossie et al.

Essentially one dimensional door motions will normally have one problem or another as previously discussed. The applicant is unaware of any door hinges offering true two dimensional motion, so as to allow the door to open vertically after a brief horizontal motion.

It would be advantageous to provide a two dimensional motion to a vehicle door, to provide a mechanism providing such motion, and to provide range of motion limits and a lag mechanism to control the motion.

SUMMARY OF THE INVENTION

General Summary

The present invention provides a door hinge mechanism allowing two dimensional motion of the door as it opens, combined with at least one mechanism allowing control of the range of horizontal motion of the door during normal operations. Horizontal lag adjustment and range limitation of the mechanism allows a number of benefits. Firstly, the horizontal fit of the door to the frame may be controlled, so that when the door is closed, the tight fit is better assured and the chance of door/frame interference and damage minimized or eliminated. Secondly, the motion may be controlled at the opposite end of the range of motion, such that the outward motion of the door may be curtailed at the proper angle desired by the user.

The door hinge mechanism is a bi-directional hinge allowing sequential motion in two planes, and a horizontal motion stop and cooperating contact surface. The mechanism employed may include set screws making perpendicular contact to surfaces of the hinge mechanism, set screws making contact to surfaces at an angle, special slots or grooves providing angled surfaces for contact, and set screws having angled bearing surfaces cooperating with one or more horizontal bearing surfaces and/or angled bearing surfaces of the overall hinge mechanism.

In greater generality, the present invention provides a door hinge mechanism imparting a two dimensional motion to the door as it opens or closes. In addition, the present mechanism provides for a motion in two different directions at two different portions of the door's motion cycle. The present invention provides a hinge which allows the door of the vehicle to move outwards in a substantially horizontal plane for a predetermined arc, then move vertically upwards thereafter, again for a predetermined arc. By this means, the vehicle frame need not be specially adapted to a door having vertical motion. At the same time, the limited horizontal motion allows a great degree of mitigation of the problems associated with horizontal-only door arcs. Thereafter, the vertical motion is unimpeded by the vehicle frame (being already somewhat distanced from the vehicle) and so a substantial vertical arc upwards may be completed, allowing the user easy entry and exit from the vehicle.

The present invention comprises a hinge and/or a bearing mechanism having a chassis mounting plate and a swingarm. Between them is either a pivotal bearing or a hinge designed to allow the staged two dimensional motion of the invention. A spring or cylinder is connected at its ends to the chassis mounting plate and the swingarm. A horizontal pressure bearing surface and a cam adjuster cooperate to provide strength and precise fit of the door with the vehicle. The present invention may be used with all types of vehicles including automobiles, trucks, vans, buses, agricultural equipment, aerial vehicles, boats and other types of vehicles having enclosed compartments.

Summary in Reference to the Claims

It is therefore a first aspect, advantage, objective and embodiment of the present invention to provide a vehicle door hinge for a vehicle door and frame, the hinge comprising: a chassis mounting plate securely fastened to such vehicle frame; a swingarm securely fastened to such vehicle door; the swingarm further comprising a first bearing surface; the chassis mounting plate further comprises a second bearing surface having a length; the first and second bearing surfaces being located so that the first surface rotates along the length of the second bearing surface during motion of the door in a first horizontal plane; at least one stop and cooperating contact surface; one of the stop and cooperating contact surface being on the chassis mounting plate; the other of the stop and cooperating contact surface being mounted on the swingarm; the stop and cooperating contact surface being located so that when the door is in a first position, the stop and cooperating contact surface are not in contact; and when the door is in a second position, the stop and cooperating contact surface contact each other and prevent motion in one direction in the first horizontal plane; whereby the strong bearing surface and the horizontal bearing surface cooperate together to take the stress of the door opening and further thereby allowing motion of the door in the first horizontal plane and a second vertical plane.

It is therefore a second aspect, advantage, objective and embodiment of the present invention to provide a hinge wherein motion of the door in the first horizontal plane and motion of the door in the second vertical plane occurs sequentially.

It is therefore a third aspect, advantage, objective and embodiment of the present invention to provide a hinge wherein the bi-directional rotation mechanism further comprises one member selected from the group consisting of: a bi-directional hinge, a spherical bearing, and combinations thereof.

It is therefore a fourth aspect, advantage, objective and embodiment of the present invention to provide a hinge wherein the stop further comprises a set screw having a head, the head of the set screw being the portion of the set screw coming into contact with the cooperating contact surface in the second position.

It is therefore another aspect, advantage, objective and embodiment of the present invention to provide a hinge wherein the head of the set screw is flat.

It is therefore a second aspect, advantage, objective and embodiment of the present invention to provide a hinge wherein the head of the set screw is conical.

It is therefore a another aspect, advantage, objective and embodiment of the present invention to provide a hinge further comprising: an internally threaded aperture; the set screw further being externally threaded, the set screw and external threads being dimensioned and configured to physically engage the internally threaded aperture.

It is therefore a another aspect, advantage, objective and embodiment of the present invention to provide a hinge wherein the cooperating contact surface is perpendicular to the set screw.

It is therefore a another aspect, advantage, objective and embodiment of the present invention to provide a hinge wherein the cooperating contact surface is at an angle to the set screw, the angle being less than 90 degrees.

It is therefore a another aspect, advantage, objective and embodiment of the present invention to provide a vehicle door hinge for a vehicle door and frame, the hinge comprising: a chassis mounting plate securely fastened to such vehicle frame; a swingarm securely fastened to such vehicle door; a bi-directional rotation mechanism allowing motion of the door in a first horizontal plane and a second vertical plane; a sag adjuster screw guide mechanism rotationally connected in the first horizontal plane to the bi-directional rotation mechanism; a sag adjuster screw bearing against the sag adjuster screw guide when the vehicle door is rotated through the first horizontal plane; at least one stop and cooperating contact surface; one of the stop and cooperating contact surface being on the chassis mounting plate; the other of the stop and cooperating contact surface being mounted on the swingarm; the stop and cooperating contact surface being located so that when the door is in a first position, the stop and cooperating contact surface are not in contact; and when the door is in a second position, the stop and cooperating contact surface contact each other and prevent further motion in one direction in the first horizontal plane.

It is therefore a another aspect, advantage, objective and embodiment of the present invention to provide a vehicle door hinge wherein the bi-directional rotation mechanism further comprises one member selected from the group consisting of: a bi-directional hinge, a spherical bearing, and combinations thereof.

It is therefore a another aspect, advantage, objective and embodiment of the present invention to provide a vehicle door hinge wherein the stop further comprises a set screw having a head, the head of the set screw being the portion of the set screw coming into contact with the cooperating contact surface in the second position.

It is therefore a another aspect, advantage, objective and embodiment of the present invention to provide a vehicle door hinge wherein the set screw is disposed upon one member selected from the group consisting of: the swingarm, the chassis mounting plate, the bi-hinge, the pin supports, the vehicle frame, the vehicle door, and combinations thereof.

It is therefore a another aspect, advantage, objective and embodiment of the present invention to provide a vehicle door hinge further comprising: an internally threaded aperture; the set screw further being externally threaded, the set screw and external threads being dimensioned and configured to physically engage the internally threaded aperture.

BRIEF DESCRIPTION OF THE DRAWINGS

FIG. 1 is a partially cut away side view of the first embodiment of the invention.

FIG. 2 is a partially cut away rear view of the first embodiment of the invention in a first position.

FIG. 3 is a partially cut away top view of the first embodiment of the invention in the first position.

FIG. 4 is a partially cut away rear view of the first embodiment of the invention in a second position.

FIG. 5 is a partially cut away top view of the first embodiment of the invention in a second position.

FIG. 6 is a partially cut away side view of the first embodiment of the invention adjusted and in the second position.

FIG. 7 is a NON-cut away rear view of the first embodiment of the invention adjusted and in the second position.

FIG. 8 is a partially cut away top view of the first embodiment of the invention adjusted and in the second position.

FIG. 9 is a side view of the second embodiment of the invention.

FIG. 10 is a partially cut away rear view of the second embodiment of the invention in a first position.

FIG. 11 is a partially cut away top view of the second embodiment of the invention in the first position.

FIG. 12 is a partially cut away rear view of the second embodiment of the invention in a second position.

FIG. 13 is a partially cut away top view of the second embodiment of the invention in a second position.

FIG. 14 is a side view of the second embodiment of the invention adjusted and in the second position.

FIG. 15 is a partially cut away rear view of the second embodiment of the invention adjusted and in the second position.

FIG. 16 is a partially cut away top view of the second embodiment of the invention adjusted and in the second position.

FIG. 17 is a side view of the third embodiment of the invention unadjusted.

DETAILED DESCRIPTION

Figure 18:
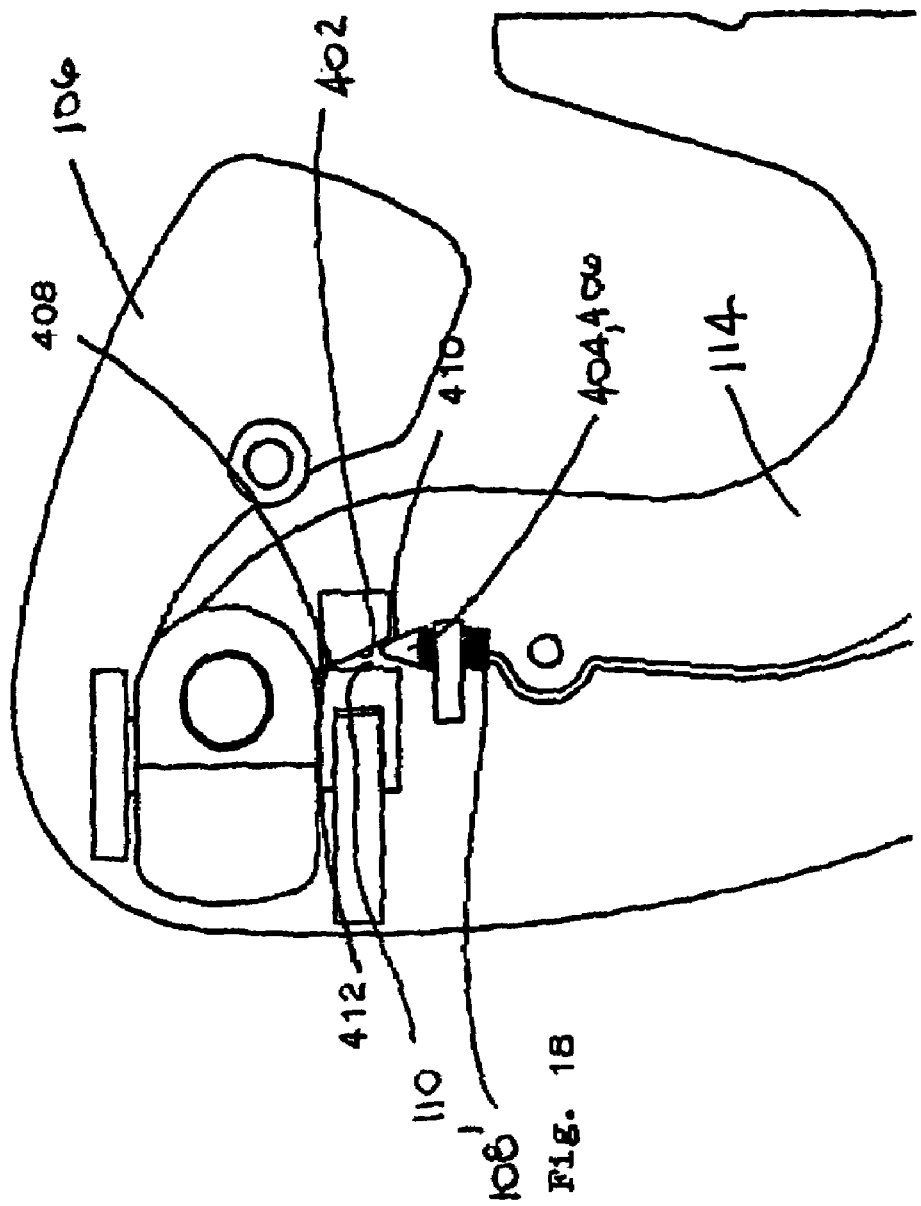
FIG. 18 is a side view of the third embodiment of the invention adjusted.

The present invention teaches several bi-directional rotation mechanisms: various types of hinges which allow rotation in more than one plane of motion. In general, the following embodiments of the bi-directional rotation mechanism have at least three distinctive positions: a first position corresponding to the door being closed, a second position corresponding to the door having opened through the horizontal plane, and a third position corresponding to the door having opened upwards from the second position through the vertical plane. One feature of the present invention is the ability in embodiments to allow substantially horizontal motion in a first horizontal arc or plane, followed by substantially vertical motion in a second vertical plane or arc, for opening the door. For closing, this sequence is reversed. The substantially horizontal motion is motion which allows the vehicle door to clear the vehicle frame, even on vehicles having frames NOT specifically designed for vertically opened doors. During this phase of opening, the distance from door to vehicle is increased. Later, the substantially vertical motion allows the door to move vertically without significantly increasing the distance from the vehicle to the door.

A second type of motion restriction involves adjustment of the door to fit properly with the frame. The door may "whistle" or wear excessively or suffer numerous other problems if it does not properly fit the vehicle frame. In particular "sag adjustment" during the horizontal motions or while the door is closed is of particular importance: negative vertical motion during this phase may be prevented by means of sturdy sag prevention mechanisms. Note, however, that this prevention may be separated conceptually from the issue of overall door motion during opening and closing.

Accurate fit of the door of the vehicle to the door frame is important to allow proper latching and locking of the door. At the far end of the door (not pictured) some combination of latch and striker must meet in exact engagement. Limiting horizontal motion at the fully open end of the door swing, as in most of the examples below, is important to prevent excess opening of the door, to reduce bi-hinge wear, to allow adjustments for vehicle and driver preferences, etc.

FIG. 1 is a partially cut away side view of the first embodiment of the invention. FIG. 2 is a partially cut away rear view of the first embodiment of the invention in a first position. FIG. 3 is a partially cut away top view of the first embodiment of the invention in the first position. FIG. 4 is a partially cut away rear view of the first embodiment of the invention in a second position and FIG. 5 is a partially cut away top view of the first embodiment of the invention in a second position. Two main components are chassis mounting plate 106 and swingarm 114, connected by the bi-directional rotation mechanism. Bi-hinge body 102 (bi-hinge body 102 being that portion of swingarm 114 disposed on the side of swingarm 114 opposite the bi-hinge rotator 104) and bi-hinge rotator 104 allow two axes of motion in the swingarm 114 in relation to the chassis mounting plate 106. Hinge pin 112 rotates in bi-hinge support 116 about a vertical axis which allows horizontal motion of the swingarm 114 in a horizontal plane. Bi-hinge rotator 104 rotates in an axis perpendicular to the plane of FIG. 1, allowing vertical motion of swingarm 114 in a vertical plane.

In this embodiment, horizontal alignment is maintained throughout the first horizontal arc/plane by means of sag adjuster screw 108 (a strong bearing surface) and sag adjuster guide/horizontal bearing surface 110. As the vehicle door opens during the horizontal phase of the motion, sag adjuster guide 110 will rotate with bi-hinge body 102 (rotationally connected in the first horizontal plane), maintaining a continuous state of contact (bearing against) with sag adjuster screw 108. The two surfaces (more broadly first and second surfaces, either of which may be disposed upon either one of the chassis mounting plate 106 and the swingarm 114) have dimensions (length and width) allowing contact during such motion. Sag adjuster screw/strong bearing surface 108 and sag adjuster guide 110 will take the weight and torque of the vehicle door (not pictured) to which swingarm 114 is attached. By taking this burden, as with other embodiments previously discussed, the life of the hinge mechanism is prolonged, the accurate fit of the door to the vehicle is maintained, and opening and closing of the door is eased.

In the closed position, chassis mounting plate 102 is securely fastened/attached to the frame of the vehicle by fasteners (not shown). Swingarm 106 is securely fastened/attached to the vehicle door by fasteners (not shown) passed through door mounting holes (not shown). Bolts, screws, rivets, welding, bonding and other types of fastening may be used without departing from the scope of the present invention. In the closed position, a tight and correct fit with correct orientation and no unusual spacing between the door and the door frame is vital: without a tight fit, the vehicle becomes noisy and drafty. In order to provide such a tight fit, it is desirable to embody the invention in high strength materials capable of maintaining a close tolerance over thousands of cycles of use. Examples of such materials include high quality metals, alloys, modem composite materials, and other materials displaying an ability to resist long term deformation under the conditions of usage. Selection and engineering of such materials will not require undue experimentation to those skilled in the art.

At the time that a user opens the door of the vehicle, the door first rotates in a horizontal plane. This motion introduces an angle between chassis mounting plate 106 and swingarm 114. This rotation does NOT take adjuster screw 108 out of contact with horizontal bearing surface 110; on the contrary the adjuster screw 108 and horizontal bearing surface 110 cooperate together to take the stress of the door opening, and to maintain the door in proper alignment with the door frame, as the adjuster screw 108 rotates or rolls along the length of horizontal bearing surface 110 (or vice-versa in other embodiments such as those of FIGS. 1, 2, and 3 of the parent application of this application as referenced and incorporated herein by reference).

As stated previously, this motion and the associated flexure occur at two locations in the bi-directional rotation mechanism: hinge pin 112 being one location and the point of contact of horizontal bearing surface 110 in physical cooperation and contact with adjuster screw 108 being the other location. By providing two places at which this motion occurs, the present invention drastically reduces the torque generated by the angular momentum of the door as its mass is rotated. This reduction in torque in turn provides greater useful life for the components of the invention and furthermore subjects the components of the invention to reduced forces, thus reducing the possibility of warping over thousands of cycles of use, thus providing a tight fit between door and frame on a continuing basis.

In the best mode presently contemplated, the arc of motion of swingarm 114 and the vehicular door to which it is attached is in the range 2 to 45 degrees. The degree of horizontal rotational motion may be selected to allow the door to clear all parts of the vehicle body during the opening cycle; this will be referred to as "substantially" clearing the vehicle body. In embodiments, the user may adjust the invention to set the degree of horizontal arc. In yet other embodiments, the user may adjust the mechanism to set the degree of vertical arc.

Referring again to FIGS. 1 through 5 of the instant application, it may be seen that stop 202 and physically cooperating surface 204 may, when out of contact, not interfere with motion of the vehicle door and swingarm in the horizontal plane. Head 203 of stop 202 is the portion actually making contact in this embodiment. However, it will be noted that head 203 may simply some portion, otherwise undifferentiated from the remainder of stop 202, which happens to be the contact portion of stop 202—this is the case in the embodiment pictured. In other embodiments, the head 203 may be of a special shape, may be a physically distinct structure, etc. One of the stop 202 and cooperating contact surface 204 is on the chassis mounting plate: in the embodiment of FIGS. 1 through 5, that is the stop 202, which is embodied as an externally threaded screw disposed in a passage though bi-hinge support 116 in physical engagement with internal threading of the passage. The other of the stop 202 and cooperating contact surface 204 is mounted on the swingarm, in this embodiment it is the contact surface 204 mounted upon the bi-hinge body 102 portion of swingarm 114. The stop 202 and cooperating contact surface 204 are located so that as shown in the FIGS. 1 through 3, when the door is in a first position, the stop and cooperating contact surface are not in contact. When the door is in a second position, the stop 202 and cooperating contact surface 204 contact each other and prevent motion in one direction in the first horizontal plane if stop 202 is properly adjusted to do this. If stop 202 is not adjusted, as shown in FIGS. 4 and 5, no interference and no contact occur and motion is not inhibited.

FIGS. 6, 7 and 8 show the adjusted operation of the device. FIG. 6 is a partially cut away side view of the first embodiment of the invention adjusted and in the second position, FIG. 7 is a NON-cut away rear view of the first embodiment of the invention adjusted and in the second position, and FIG. 8 is a partially cut away top view of the first embodiment of the invention adjusted and in the second position. It will be seen that interference and contact have occurred between stop 202 and cooperating contact surface 204, restricting the freedom of motion in the horizontal plane about the vertical axis of rotation provided by bi-hinge pin 112.

It is extremely desirable to be able to set/select the desired degree of horizontal motion. Different cars, different users and different parking situations present different circumstances to the users of the invention. Any of these could alter how much clearance is desired vertically and how much horizontally, and the devices of the present invention allow easy adjustment of such clearance. In particular, the present invention dramatically improves horizontal clearance of the vehicle doors, and adjustment in the horizontal plane is likely to be a greater issue: parking situations typically present little vertical obstacles to car doors, but numerous horizontally located obstacles occur: other vehicles, walls, posts, etc.

FIG. 9 is a side view of the second embodiment of the invention, FIG. 10 is a partially cut away rear view of the second embodiment of the invention in a first position and FIG. 11 is a partially cut away top view of the second embodiment of the invention in the first position. FIG. 12 is a partially cut away rear view of the second embodiment of the invention in a second position and FIG. 13 is a partially cut away top view of the second embodiment of the invention in a second position, all unadjusted.

Chassis mounting plate 106 and swingarm 114 are physically connected so as to allow sequential rotation in two planes by mechanisms generally similar to the previous embodiment. However, horizontal swing control is provided by set screw 302 (having head 303) functioning as a stop against cooperating contact surface 315, a portion of chassis plate 106 normally hidden by the hinge body. When swingarm 114 is in a first position (FIG. 11) there is no contact between set screw 302 and contact surface 315. However, in a second position (FIG. 13) there may be contact, depending upon the adjustment of stop/set screw 302. In FIG. 13, the adjustment (or "unadjusted" state) still causes no contact.

FIG. 14 is a side view of the second embodiment of the invention adjusted and in the second position and FIG. 15 is a partially cut away rear view of the second embodiment of the invention adjusted and in the second position. FIG. 16 is a partially cut away top view of the second embodiment of the invention adjusted and in the second position. As may be seen, the adjusted set screw 302 has head 303 which contacts cooperating contact surface 315 and prevents a certain degree of horizontal motion otherwise present in the system.

While a single portion of the horizontal motion is depicted to be stopped by means of the present device, it will be readily appreciated that the invention may be adapted to prevent horizontal motion at the other extreme of freedom (in other words, preventing motion at the "fully closed" portion of the door swing rather than the "fully open" end of the swing). In other embodiments, the portion of the stop/cooperating surface unit which is mounted on the swingarm may be rotationally connected to the portion of the swingarm which travels vertically, rather than the bi-hinge body portion of the swingarm as shown here. Mounted thus, the device may be used to limit motion in the vertical plane rather than the horizontal plane.

It will be appreciated that such adjustments allow a single bi-hinge mechanism to be used in more than one type of vehicle: different adjustments of the horizontal and vertical motions may be provided for different vehicle frame shapes.

FIG. 17 is a side view of the third embodiment of the invention unadjusted, while FIG. 18 is a side view of the third embodiment of the invention adjusted. It will be seen that this is one typical embodiment in which the sag adjuster screw 108' is mounted upon the chassis mounting plate and the operative bearing surfaces are rearranged in terms of layout, orientation, location and so on.

Chassis mounting plate 106 and swingarm 114 are once again connected by the bi-hinge arrangement. In this embodiment, sag adjuster screw 108' has conical head 404 having conical bearing surface 406. Conical head/bearing surface 404, 406 are disposed so that they are interposed in between horizontal bearing surface 110 and strong swingarm bearing surface 402, which is set at an angle matching the angle of conical head/bearing surface 404, 406. Horizontal bearing surface 110 is mounted upon or secured to chassis mounting plate 106, swingarm bearing surface 402 is mounted upon or secured to swingarm 114.

In use, sag adjuster screw 108' is adjusted so that swingarm bearing surface 402 and horizontal bearing surface 110 may contact each other as shown in FIG. 18. In addition, sag adjuster screw 108' is contacted by swingarm bearing surface 402 as well.

An upper portion 408 of swingarm bearing surface 402 may contact horizontal bearing surface 110, while a lower potion 410 of swingarm bearing surface 402 may contact conical bearing surface 406. By this means, the weight of the vehicle door may be taken in two different locations. This has several advantages, including but limited to the fact that wear and tear on the mechanism may be decreased. In addition, two different surfaces are available to stop or slow vertical motion of the door, thus providing a potential safety factor in use.

Sag adjuster screw 108' may be seen to fulfill its former function of vertical sag adjustment across the arc of horizontal motion the vehicle door may cross. In addition, sag adjuster screw 108' continues to act as a vertical motion limitation device: when the vehicle door is lowered, the contact of strong bearing surface 402 with conical bearing surface 406 will act to limit further downwards motion.

In alternative sub-embodiments of this particular embodiment, the contact region 412 of horizontal bearing surface 110 and swingarm bearing surface 402 may not resemble horizontal surfaces at all. For example, contact region 412 may be a groove with upper portion 408 sliding there into when the door is at or near the vertical lower limit of motion. Contact region 412 may be a rotating mechanism capable of physically engaging with upper portion 408, which may itself be another mechanism capable of cooperating physical engagement with contact region 412.

Regardless of embodiment, after the first phase of motion is completed, the door may swing through a second vertical plane/arc (not shown). The bi-hinge now enables swingarm 114 to rotate in a new direction. Dimensionally, the new direction of rotation need not be exactly orthogonal to the direction of motion during the first phase, that is, the new motion is substantially vertical in the preferred embodiment but in other embodiments the direction of rotation may considerably depart from the vertical. The motion occurs sequentially in this embodiment and certain other embodiments: the motion of the door in first horizontal plane and motion of the door in the second vertical plane occur one after the other, rather than at the same time.

During this rotation, the strong bearing surface and the horizontal bearing surface are removed from one another by the rotation of the swingarm. The door, however, now swings upwards out of the way of the user, allowing easy entry and exit from the vehicle, this will be referred to as "substantially clearing the door way" of the vehicle. The phrase fully completed motion in the first horizontal plane includes, for purposes of this application, the fact that the door must move outward from the vehicle body horizontally by a distance sufficient to avoid damage to the vehicle frame/body during the vertical motion.

A gas strut or spring of various types may be used. In general, the shock/spring is designed to function as a counter balance to the weight of the door, thus allowing much easier door motion up or down. Ideally, the strut used may almost exactly balance the mass of the door, thus drastically reducing the difficulty of swinging the door upwards. The spring used may be a conventional spring such as a coil spring, or it may be a gas strut, a combination device or other types of gas or metal spring, without departing from the scope of the present invention. The strut/spring may also be a hydraulic cylinder actuated by a master cylinder located elsewhere in the vehicle, however, this option makes the desirable retrofitting embodiment of the invention less easy to accomplish. The spring may be fastened at both ends to spring mounting holes, as in the favored embodiment, or other securing structures and means may be used within the scope of the invention.

It is worth noting that in all embodiments in which the invention is installed on both sides of the vehicle, the embodiment becomes a mirror image of the diagrams shown in this application.

One preferred embodiment of the present invention is as a retrofit kit. In general, only a few models of extremely expensive cars have doors which open vertically at the present time, despite the numerous advantages (alluded to earlier) of vertical arc doors. The present invention may in one alternative embodiment be factory installed, however in another embodiment, it may be easily retrofitted to existing vehicles doors, thus offering the convenience of vertical rotation doors to vehicles already in use.

In embodiments, the retrofit kit may be used with a wide range of different years, makes and models of vehicles. For example the retrofit kit may be employed with an extremely wide range of automobile makes and models if the end user drills appropriate mounting holes.

In the retrofit operation, the user will remove the conventional door hinges. The invention may be installed either as a hole-for-hole replacement of the older equipment, or the user may drill new holes or weld as needed to accommodate the door mounting plate portion of the swingarm and the chassis mounting plate of the invention. The chassis mounting plate may be fastened securely to the vehicle frame, the swingarm may be securely fastened to the vehicle door, and the bi-directional rotation mechanism connecting them installed. The spring or strut may be installed next. Next, the user will carefully manipulate the mechanism to determine the extent of the play present when the door is closed and adjust the cam adjuster to provide a tight and correct fit when closed. Finally, the user will carefully determine what horizontal angle of rotation is necessary to provide clearance from all other parts of the automobile during the opening cycle and what vertical angle of rotation is desirable for minimum obstruction of the user.

The present invention may be embodied into all types of vehicles especially including automobiles, trucks and vans, but further including buses, agricultural equipment, aerial vehicles, boats and other types of vehicles having enclosed compartments.

This disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood only from the following claims.

The invention claimed is:

1. A retrofit kit for a vehicle door hinge, comprising:
a chassis mounting plate securely fastenable to a vehicle frame;
a swingarm securely fastenable to a vehicle door;
a bi-directional rotation mechanism connected to the chassis mounting plate and the swingarm, thereby allowing motion of the swingarm in a horizontal plane and a vertical plane relative to the chassis mounting plate; and
a sag adjuster screw guide mechanism on one of the chassis mounting plate and the swingarm, and a sag adjuster screw on the other of the chassis mounting plate and the swingarm, the sag adjuster screw bearing against the sag adjuster screw guide mechanism when the swingarm is rotated in the horizontal plane.

2. The retrofit kit of claim 1, wherein the sag adjuster screw guide mechanism is rotationally connected in the horizontal plane to the bi-directional rotation mechanism.

3. The retrofit kit of claim 1, wherein the sag adjuster screw rotates along the sag adjuster screw guide mechanism when the swingarm is rotated in the horizontal plane.

4. The retrofit kit of claim 1, wherein the sag adjuster screw is on the swingarm.

5. The retrofit kit of claim 1, wherein the sag adjuster screw is on the chassis mounting plate and the sag adjuster screw guide mechanism is on the swingarm.

6. The retrofit kit of claim 1, wherein the sag adjuster screw is adjustable to maintain a desired horizontal alignment during motion of the swingarm in the horizontal plane.

7. The retrofit kit of claim 1, wherein the bi-directional rotation mechanism is configured such that motion of the swingarm in the horizontal plane and motion of the swingarm in the vertical plane occurs sequentially.

8. A retrofit kit for a vehicle door hinge, comprising:
a chassis mounting plate securely fastenable to a vehicle frame;
a swingarm securely fastenable to a vehicle door;
a bi-directional rotation mechanism allowing motion of the swingarm in a horizontal plane and a vertical plane relative to the chassis mounting plate; and
a sag adjuster screw guide mechanism on one of the chassis mounting plate and the swingarm, and a sag adjuster screw on the other of the chassis mounting plate and the swingarm, the sag adjuster screw bearing against the sag adjuster screw guide mechanism when the swingarm is rotated in the horizontal plane;
wherein the bi-directional rotation mechanism comprises:
a bi-hinge body pivotally mounted to the chassis mounting plate such that the bi-hinge body is rotatable about a vertical axis allowing motion of the swingarm in the horizontal plane; and a bi-hinge rotator mounted between the swingarm and the bi-hinge body, the bi-hinge rotator being rotatable relative to the bi-hinge body allowing vertical motion of the swingarm in the vertical plane.

9. The retrofit kit of claim 8, wherein the bi-hinge body is pivotally mounted to the chassis mounting plate by a bi-hinge support.

10. The retrofit kit of claim 9, wherein the bi-hinge body comprises a hinge pin that rotates in the bi-hinge support.

11. The retrofit kit of claim 8, wherein the bi-hinge body is pivotally mounted to the chassis mounting plate by a pair of hinge pins rotatable within respective bi-hinge supports.

12. A hinge for a vehicle door and frame, comprising:
a chassis mounting plate securely fastenable to a vehicle frame;
a swingarm securely fastenable to a vehicle door;
a bi-directional rotation mechanism allowing motion of the swingarm in a horizontal plane and a vertical plane, the bi-directional rotation mechanism comprising:
a bi-hinge body pivotally mounted to the chassis mounting plate such that the bi-hinge body is rotatable about a vertical axis allowing motion of the swingarm in the horizontal plane; and
a bi-hinge rotator mounted between the swingarm and the bi-hinge body, the bi-hinge rotator being rotatable relative to the bi-hinge body allowing motion of the swingarm in the vertical plane;
wherein the hinge further comprises:
a sag adjuster screw guide mechanism on one of the chassis mounting plate and the swingarm; and
a sag adjuster screw on the other of the chassis mounting plate and the swingarm, the sag adjuster screw bearing against the sag adjuster screw guide mechanism when the swingarm is rotated in the horizontal plane.

13. The hinge of claim 12, wherein the sag adjuster screw rotates along the sag adjuster screw guide mechanism when the swingarm is rotated in the horizontal plane.

14. The hinge of claim 12, wherein the sag adjuster screw is on the swingarm.

15. The hinge of claim 12, wherein the sag adjuster screw is on the chassis mounting plate and the sag adjuster screw guide mechanism is on the swingarm.

16. The hinge of claim 12, wherein the sag adjuster screw is adjustable to maintain a desired horizontal alignment during motion of the swingarm in the horizontal plane.

17. The hinge of claim 12, wherein the bi-hinge body is pivotally mounted to the chassis mounting plate by a bi-hinge support.

18. The hinge of claim 17, wherein the bi-hinge body comprises a hinge pin that rotates in the bi-hinge support.

19. The hinge of claim 12, wherein the bi-hinge body is pivotally mounted to chassis mounting plate by a pair of hinge pins rotatable within respective bi-hinge supports.

20. A hinge for a vehicle door and frame, comprising:
a chassis mounting plate securely fastenable to a vehicle frame, the chassis mounting plate comprising a first bearing surface;
a swingarm securely fastenable to a vehicle door, the swingarm comprising a second bearing surface;
a bi-directional rotation mechanism connected to the chassis mounting plate and the swingarm such that the swingarm is pivotable relative to the chassis mounting plate in a horizontal plane and a vertical plane;
the first and second bearing surfaces being located so that the first bearing surface bears against the second bearing surface during motion of the swingarm in the horizontal plane, and the second bearing surface is separated from the first bearing surface during motion of the swingarm in the vertical plane;
wherein the first and second bearing surfaces comprise a sag adjuster screw guide mechanism and a sag adjuster screw on the chassis mounting plate and the swingarm, the sag adjuster screw bearing against the sag adjuster screw guide mechanism when the swingarm is rotated in the horizontal plane.

21. The hinge of claim 20, wherein at least one of the first and second bearing surfaces comprises a swingarm angle adjuster that allows adjustment of the swingarm relative to the chassis mounting plate, thereby allowing adjustment of the vehicle door relative to the vehicle frame when the hinge is fastened to a vehicle door and frame.

22. The hinge of claim 21, wherein the swing arm adjuster is adjustable to maintain a desired horizontal alignment during motion of the swingarm in the horizontal plane.

23. The hinge of claim 20, wherein the sag adjuster screw rotates along the sag adjuster screw guide mechanism when the swingarm is rotated in the horizontal plane.

24. The hinge of claim 20, wherein the sag adjuster screw is on the swingarm.

25. The hinge of claim 20, wherein the sag adjuster screw guide mechanism is rotationally connected in the horizontal plane to the bi-directional rotation mechanism.

26. The hinge of claim 20, further comprising a bi-directional rotation mechanism allowing motion of the swingarm relative to the chassis mounting plate in the horizontal and vertical planes.

27. The hinge of claim 26, wherein the bi-directional rotation mechanism comprises:
a bi-hinge body pivotally mounted to the chassis mounting plate such that the bi-hinge body is rotatable about a vertical axis allowing motion of the swingarm in the horizontal plane; and
a bi-hinge rotator mounted between the swingarm and the bi-hinge body, the bi-hinge rotator being rotatable relative to the bi-hinge body allowing vertical motion of the swingarm in the vertical plane.

* * * * *